US012431674B2

(12) United States Patent
Liang et al.

(10) Patent No.: US 12,431,674 B2
(45) Date of Patent: Sep. 30, 2025

(54) POWER ADAPTION DEVICE

(71) Applicants: Huizhou Zhongbang Electronics Co., Ltd., Huizhou (CN); Huizhou Zhongbang Power Co., Ltd., Huizhou (CN)

(72) Inventors: Dexin Liang, Huizhou (CN); Qiping Xiang, Huizhou (CN); Hui Li, Huizhou (CN); Jiazhi Mo, Huizhou (CN); Jiantong Ruan, Huizhou (CN)

(73) Assignees: Huizhou Zhongbang Electronics Co., Ltd., Huizhou (CN); Huizhou Zhongbang Power Co., Ltd., Huizhou (CN)

( * ) Notice: Subject to any disclaimer, the term of this patent is extended or adjusted under 35 U.S.C. 154(b) by 481 days.

(21) Appl. No.: 18/065,626

(22) Filed: Dec. 14, 2022

(65) Prior Publication Data

US 2023/0198211 A1 Jun. 22, 2023

(30) Foreign Application Priority Data

Dec. 16, 2021 (CN) ......................... 202111543603.2

(51) Int. Cl.
*H01R 13/00* (2006.01)
*H01R 13/56* (2006.01)
*H01R 13/66* (2006.01)
*H01R 24/28* (2011.01)
*H01R 103/00* (2006.01)

(52) U.S. Cl.
CPC ............. *H01R 24/28* (2013.01); *H01R 13/56* (2013.01); *H01R 13/6675* (2013.01); *H01R 2103/00* (2013.01)

(58) Field of Classification Search
CPC ............................ H01R 13/56; H01R 13/6675
See application file for complete search history.

(56) References Cited

U.S. PATENT DOCUMENTS

| | | | | |
|---|---|---|---|---|
| 4,518,212 A * | 5/1985 | Rumble | H01R 31/06 | 439/166 |
| 5,580,266 A * | 12/1996 | Shelly | H01R 13/53 | 439/281 |
| 6,994,595 B2 * | 2/2006 | Baker | H01R 13/44 | 439/680 |
| 7,144,262 B2 * | 12/2006 | Cheng | H04M 1/72409 | 439/151 |
| 8,360,800 B1 * | 1/2013 | Finona | H01R 13/6456 | 439/378 |
| 9,017,092 B1 * | 4/2015 | McCracken | H01R 13/648 | 439/39 |
| 9,065,205 B2 * | 6/2015 | Gao | H01R 13/6592 | |
| 9,147,965 B2 * | 9/2015 | Lee | H01R 13/6205 | |

* cited by examiner

*Primary Examiner* — Phuong Chi Thi Nguyen

(57) ABSTRACT

A power adaption device includes an electrical cord assembly and an adaptor plug assembly. The adaptor plug assembly includes an electrical conduction member and a tightness adjustment member. The electrical conduction member is formed with an insertion hole and an adjustment hole in communication with each other. The electrical cord assembly is insertable into the insertion hole to electrically connect the electrical cord assembly with the electrical conduction member. The tightness adjustment member is screwed into and connected to the adjustment hole to abut the electrical cord assembly. As such, firmness of connection between the electrical cord assembly and the adaptor plug assembly can be enhanced.

16 Claims, 17 Drawing Sheets

10

A-A

B

POWER ADAPTION DEVICE

FIELD OF THE INVENTION

The present invention relates to the technical field of voltage transformation equipment, and more particularly to a power adaption device.

DESCRIPTION OF THE RELATED ART

Electronic components are generally connected with a power adaption device, such as a power adaptor, in order to prevent the electronic components from being broken by an excessively large voltage. A power adaption device is a kind of power transformation equipment for small-sized portable electronic equipment and electronic appliances, and its principle of operation is to transform an input of an alternate current into an output of a direct current, and is classified, based on the way of connection, into a wall socket type and a desktop type. It is widely used in sofas, security camera devices, set-top boxes, routers, light strips, and massage devices.

An example power adaption device comprises an electrical cord assembly and an adaptor plug assembly that are connected to each other. The electrical cord assembly is connectable with an electronic component, while the plug assembly is connectable with a household power supply in order to supply electricity to the electronic component. However, the electrical cord assembly and the adaptor plug assembly are interconnected through snap engagement, so that the electrical cord assembly and the adaptor plug assembly may be easily detached unexpectedly from each other by an external force applied thereto to thereby cut off the supply of electricity to the electronic component.

SUMMARY OF THE INVENTION

An objective of the application is to overcome the deficiency of the prior art and provides a power adaption device that is more firmly connected.

The objective of the present invention is achieved with the following technical solution:

A power adaption device comprises an electrical cord assembly and an adaptor plug assembly. The adaptor plug assembly comprises an electrical conduction member and a tightness adjustment member, the electrical conduction member being formed with an insertion hole and an adjustment hole in communication with each other, the electrical cord assembly being insertable into the insertion hole to electrically connect the electrical cord assembly with the electrical conduction member; the tightness adjustment member being screwable into and connected with the adjustment hole to abut the electrical cord assembly.

Compared with the prior art, the application possesses at least the following advantages:

In the above-discussed power adaption device, the tightness adjustment member is screwed into and connected to the adjustment hole and abuts the electrical cord assembly, so that by twisting the tightness adjustment member, an action force between the electrical cord assembly and the tightness adjustment member can be adjusted, and thus tightness that the tightness adjustment member induces in the insertion hole can be adjusted. In other words, when the power adaption device is to be put into operation, the tightness adjustment member is twisted tight in order to increase the action force between the electrical cord assembly and the tightness adjustment member to thereby enhance firmness of the electrical cord assembly retained in the insertion hole to prevent the electrical cord assembly from being erroneously pulled out of the insertion hole and thus preventing an issue that the supply of electricity to the electronic component is unexpectedly cut off; and when it needs to separate the electrical cord assembly and the adaptor plug assembly, the tightness adjustment member is twisted loose to decrease the action force between the electrical cord assembly and the tightness adjustment member so as to reduce the firmness of the electrical cord assembly retained in the insertion hole to allow the electrical cord assembly to be withdrawn. In this way, by means of twisting of the tightness adjustment member, an issue of unexpected separation of the electrical cord assembly from the adaptor plug assembly can be prevented to thereby prevent mistakenly cutting off the supply of electricity to the electronic component, while easiness of separating the electrical cord assembly from the adaptor plug assembly can be enhanced.

BRIEF DESCRIPTION OF THE DRAWINGS

To more clearly expound the technical solution of embodiments of the application, a brief description will be provided below for the drawings that are necessary for illustrating the embodiments. It is noted that the drawings described below illustrate only some of the embodiments of the application, and should not be construed as constraint to the scope. Based on such drawings, those having ordinary skill in the art may envisage other related drawings without creative endeavor.

DETAILED DESCRIPTION OF EMBODIMENTS

Figure 1:
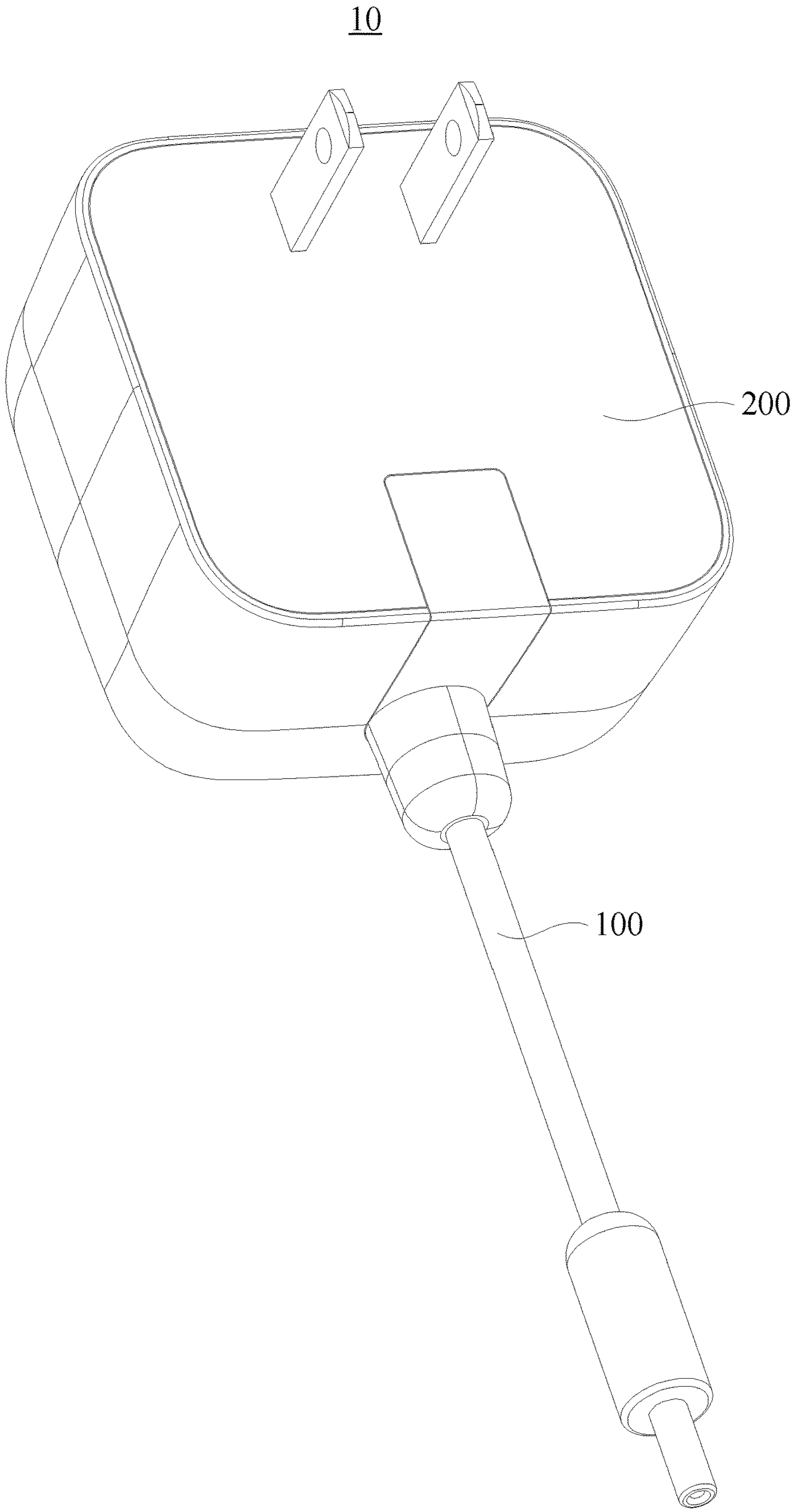
FIG. 1 is a schematic structure diagram of a power adaption device according to an embodiment.

To allow the application to be easily understood, a more detailed description of the application will be provided below with reference to the drawings. The drawings provide preferred ways of embodiment of the application. However, the application can be realized with numerous different forms and is not limited to the embodiments illustrated in the disclosure. Instead, the purpose of providing these embodiments is to have the disclosed contents of the application more throughout and more completely appreciated.

It is noted that when an element is referred to as being "fixed" to another element, it can be directly on said another element, or there may be an intervening element existing therebetween. When an element is referred to as being "connected" to another element, it can be directly connected to said another element, or there may similarly be an intervening element therebetween. The terms "vertical", "horizontal", "left", "right", and similar expressions as used in the disclosure are only used for the purposes of illustration and not for suggesting they being the only way of embodying.

Unless otherwise indicated, all the technical and scientific terminology used in the disclosure have the same literal meanings as to those that are commonly known by artisans in the technical field to which the application belongs. The terminology used in the specification of the application as used in the disclosure is for the purposes of illustrating specific embodiments, and is not intended to limit the application. The term "and/or", as sued in the disclosure, includes a single one or any combination and all possible combinations of multiple ones of related items in a list.

As shown in FIGS. 1-5, a power adaption device 10 according to an embodiment comprises an electrical cord assembly 100 and an adaptor plug assembly 200. The adaptor plug assembly 200 comprises an electrical conduction member 210 and a tightness adjustment member 220. The electrical conduction member 210 is formed with an insertion hole 211 and an adjustment hole 212 that are in communication with each other. The electrical cord assembly 100 is insertable into the insertion hole 211 to have the electrical cord assembly 100 electrically connected with the electrical conduction member 210. The tightness adjustment member 220 is screwable into and connectable to the adjustment hole 212 to abut the electrical cord assembly 100. In the instant embodiment, the adaptor plug assembly 200 is connectable with a household electrical grid, meaning the adaptor plug assembly 200 is pluggable into a household socket. The electrical conduction member 210 is formed with an insertion hole 211 and an adjustment hole 212 in communication with each other, wherein the adjustment hole 212 is a threaded hole, and an extension direction of the insertion hole 211 and an extension direction of the adjustment hole 212 form therebetween an included angle, meaning the extension direction of the insertion hole 211 is not parallel with the extension direction of the adjustment hole 212. An end of the electrical cord assembly 100 is electrically connectable with an electronic component, and an opposite end of the electrical cord assembly 100 is insertable into the insertion hole 211, so as to have the electrical cord assembly 100 electrically connected with the electrical conduction member 210. The tightness adjustment member 220 is screwed into and connected to the adjustment hole 212, and the tightness adjustment member 220 abuts the electrical cord assembly 100 inserted into the insertion hole 211 to fix the end of the electrical cord assembly 100 in the insertion hole 211. It is appreciated that the tightness adjustment member 220 can be a screw, a bolt, a threaded rod, or other existing fasteners.

In the above-discussed power adaption device 10, the tightness adjustment member 220 is screwed into and connected to the adjustment hole 212 and abuts the electrical cord assembly 100, so that by twisting the tightness adjustment member 220, an action force between the electrical cord assembly 100 and the tightness adjustment member 220 can be adjusted, and thus tightness that the tightness adjustment member 220 induces in the insertion hole 211 can be adjusted. In other words, when the power adaption device 10 is to be put into operation, the tightness adjustment member 220 can be twisted tight in order to increase the action force between the electrical cord assembly 100 and the tightness adjustment member 220 to thereby enhance firmness of the electrical cord assembly 100 retained in the insertion hole 211 to prevent the electrical cord assembly 100 from being erroneously pulled out of the insertion hole 211 and thus prevent an issue that the supply of electricity to the electronic component is unexpectedly cut off. When it needs to separate the electrical cord assembly 100 and the adaptor plug assembly 200, the tightness adjustment member 220 is twisted loose to decrease the action force between the electrical cord assembly 100 and the tightness adjustment member 220 so as to reduce the firmness of the electrical cord assembly 100 retained in the insertion hole 211 to allow the electrical cord assembly 100 to be withdrawn. In this way, by means of twisting of the tightness adjustment member 220, an issue of unexpected separation of the electrical cord assembly 100 from the adaptor plug assembly 200 can be prevented to thereby prevent mistakenly cutting off the supply of electricity to the electronic component, while easiness of separating the electrical cord assembly 100 from the adaptor plug assembly 200 can be enhanced.

Figure 5:
FIG. 5 is a further partial schematic structure diagram of the power adaption device illustrated in FIG. 1.

As shown in FIG. 5, in one of the embodiments, the adaptor plug assembly 200 further comprises a pre-fixing spring plate 230. The pre-fixing spring plate 230 is fit in and connected to the adjustment hole 212, and the pre-fixing spring plate 230 is partly located in the insertion hole 211 and abuts the electrical cord assembly 100 to achieve pre-fixing of the electrical cord assembly 100. The tightness adjustment member 220 is screwed into and connected to the adjustment hole 212 to compress the pre-fixing spring plate 230 in order to increase an abutting force that the pre-fixing spring plate 230 applies to the electrical cord assembly 100 to thereby fixedly connect the electrical cord assembly 100 in the insertion hole 211.

In the instant embodiment, the pre-fixing spring plate 230 is of an elastic structure, and a size of the pre-fixing spring plate 230 before being acted upon by a force is greater than the adjustment hole 212, so that the pre-fixing spring plate 230 is insertable into and retainable in the adjustment hole 212, and a portion of the pre-fixing spring plate 230 is located in the insertion hole 211. The electrical cord assembly 100 is inserted into the insertion hole 211 and is abutted by the pre-fixing spring plate 230, so that the electrical cord assembly 100 is pre-fixed in the insertion hole 211. Specifically, when the electrical cord assembly 100 is being inserted into the insertion hole 211, the electrical cord assembly 100 compresses the pre-fixing spring plate 230 to cause deformation of the pre-fixing spring plate 230 so as to make the pre-fixing spring plate 230 applying a spring force on the electrical cord assembly 100 to have the electrical cord pre-fixed in the insertion hole 211, making the electrical cord assembly 100 not withdrawn out of the insertion hole 211 during an operation of adjusting the tightness adjustment member 220, thereby improving easiness of applying the tightness adjustment member 220 to fix the electrical cord assembly 100. The tightness adjustment member 220 is screwed into and connected to the adjustment hole 212 to compress the pre-fixing spring plate 230, in order to increase the spring force that the pre-fixing spring plate 230 applies to the electrical cord assembly 100, to thereby fix the electrical cord assembly 100 in the insertion hole 211. The pre-fixing spring plate 230 is of a plate-like structure, so as to increase an abutted area of the electrical cord assembly 100, thereby suppressing damage to the electrical cord assembly 100 and thus increasing the service life of the electrical cord assembly 100.

In one of the embodiments, the pre-fixing spring plate 230 comprises a first elastic portion and a second elastic portion. An end of the first elastic portion is connected to an end of the second elastic portion, and the first elastic portion and the second elastic portion forms an acute angle therebetween. The first elastic portion is fit into and retained in the adjustment hole 212, and the first elastic portion abuts the tightness adjustment member 220. The second elastic portion is located in the insertion hole 211, and the second elastic portion abuts the electrical cord assembly 100.

In the instant embodiment, the first elastic portion and the second elastic portion are both of a plate-like structure, and the first elastic portion and the second elastic portion are connected to each other and the first elastic portion and the second elastic portion form an acute angle. When the electrical cord assembly 100 is inserted into the insertion hole 211, the electrical cord assembly 100 abuts the second elastic portion, and the electrical cord assembly 100 pushes the second elastic portion to bend in a direction toward the first elastic portion, so as to allow the electrical cord assembly 100 to penetrate into the insertion hole 211 and simultaneously increase the spring force that the second elastic portion applies to the electrical cord assembly 100 to thereby achieve pre-fixing of the electrical cord assembly 100 in the insertion hole 211. When the tightness adjustment member 220 is brought into abutting engagement with the first elastic portion, the first elastic portion and the second elastic portion are both deformed in a direction toward the electrical cord assembly 100 to thereby increase the spring force that the second elastic portion applies to the electrical cord assembly 100, and thus fixing the electrical cord assembly 100 in the insertion hole 211.

In one of the embodiments, the second elastic portion is arranged oblique toward an opening of the insertion hole 211, so that in a direction of insertion of the electrical cord assembly 100, a space between the second elastic portion and an inner wall of the insertion hole 211 is gradually expanded to thereby improve the easiness of the insertion of the electrical cord assembly 100 into the insertion hole 211.

Figure 2:
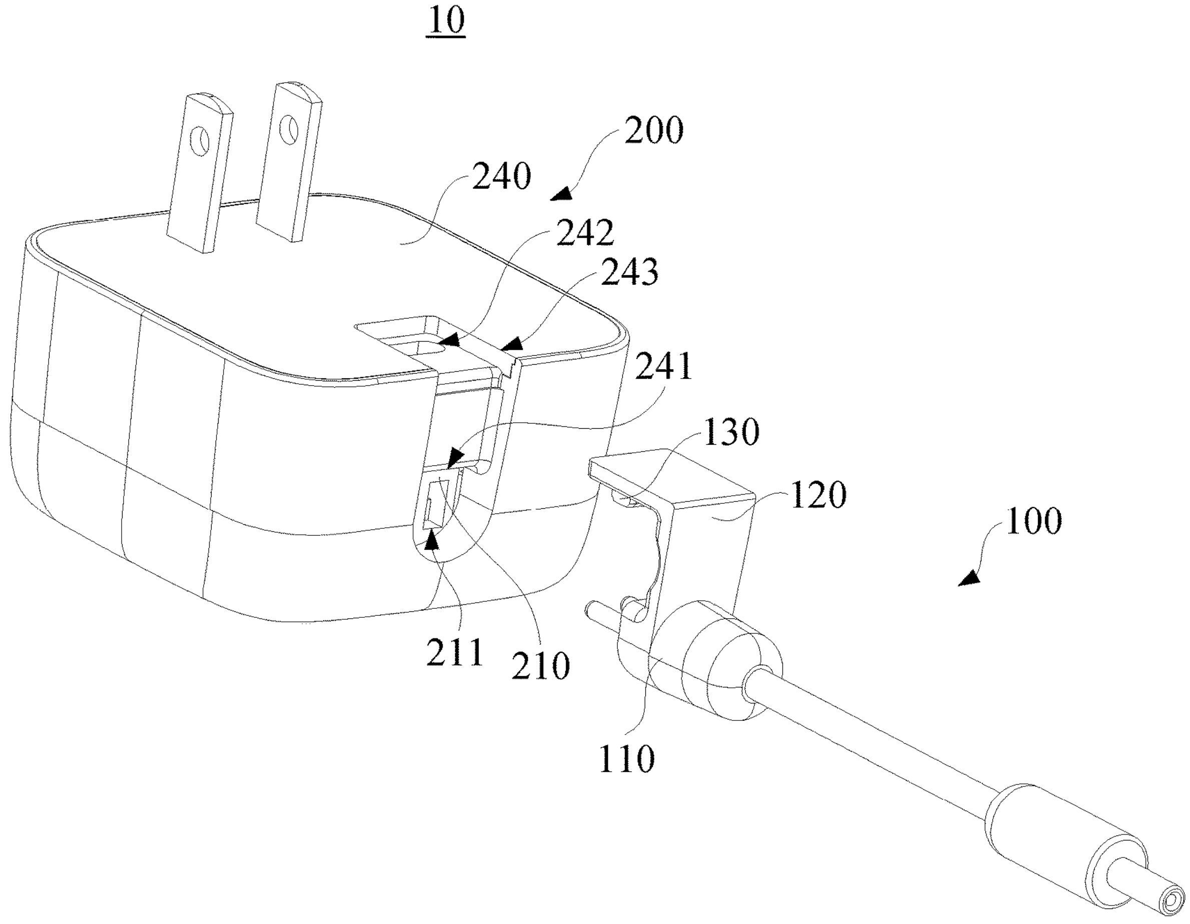
FIG. 2 is an exploded view of the power adaption device illustrated in FIG. 1.
Figure 3:
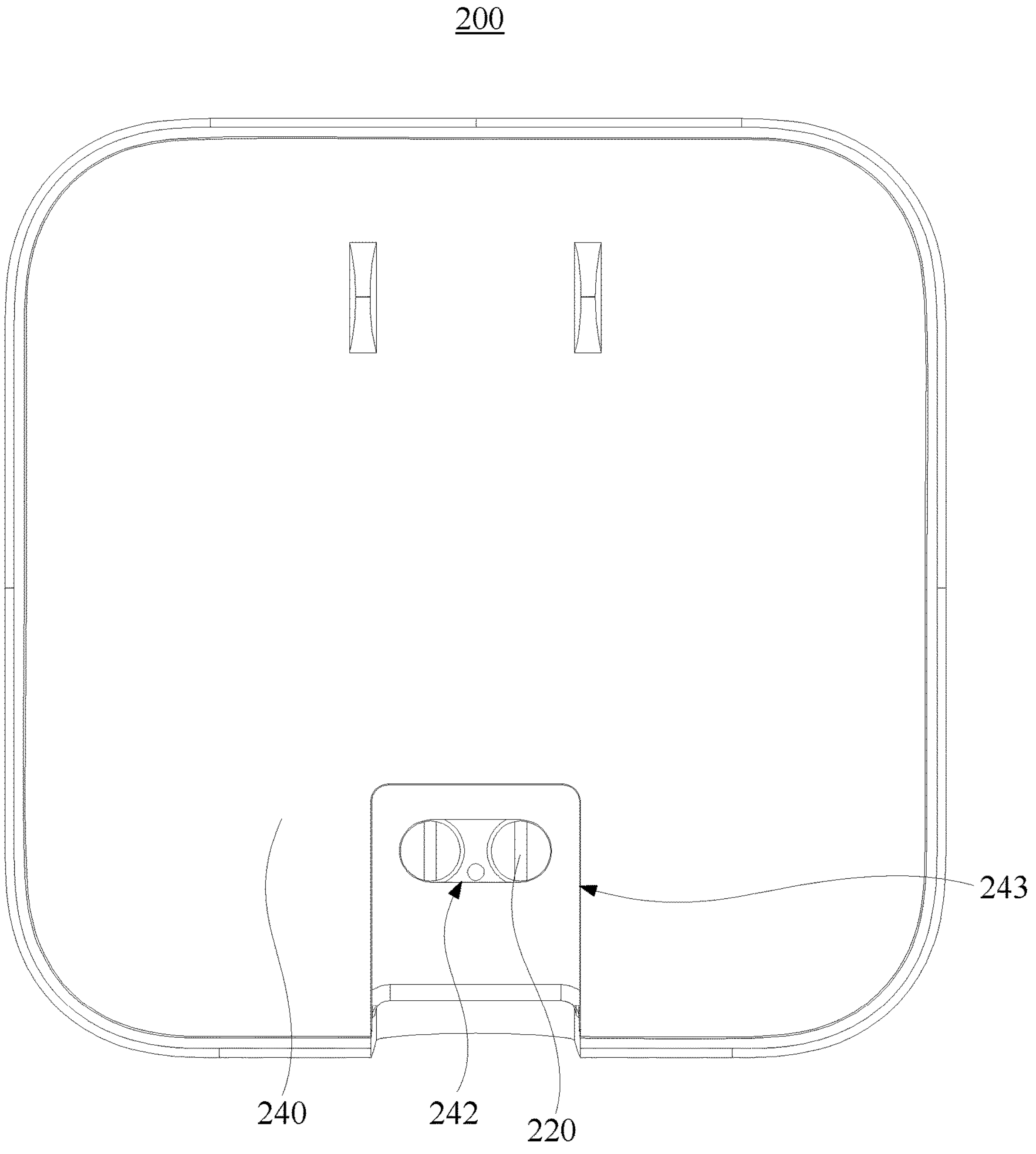
FIG. 3 is a partial schematic structure diagram of the power adaption device illustrated in FIG. 1.
Figure 4:
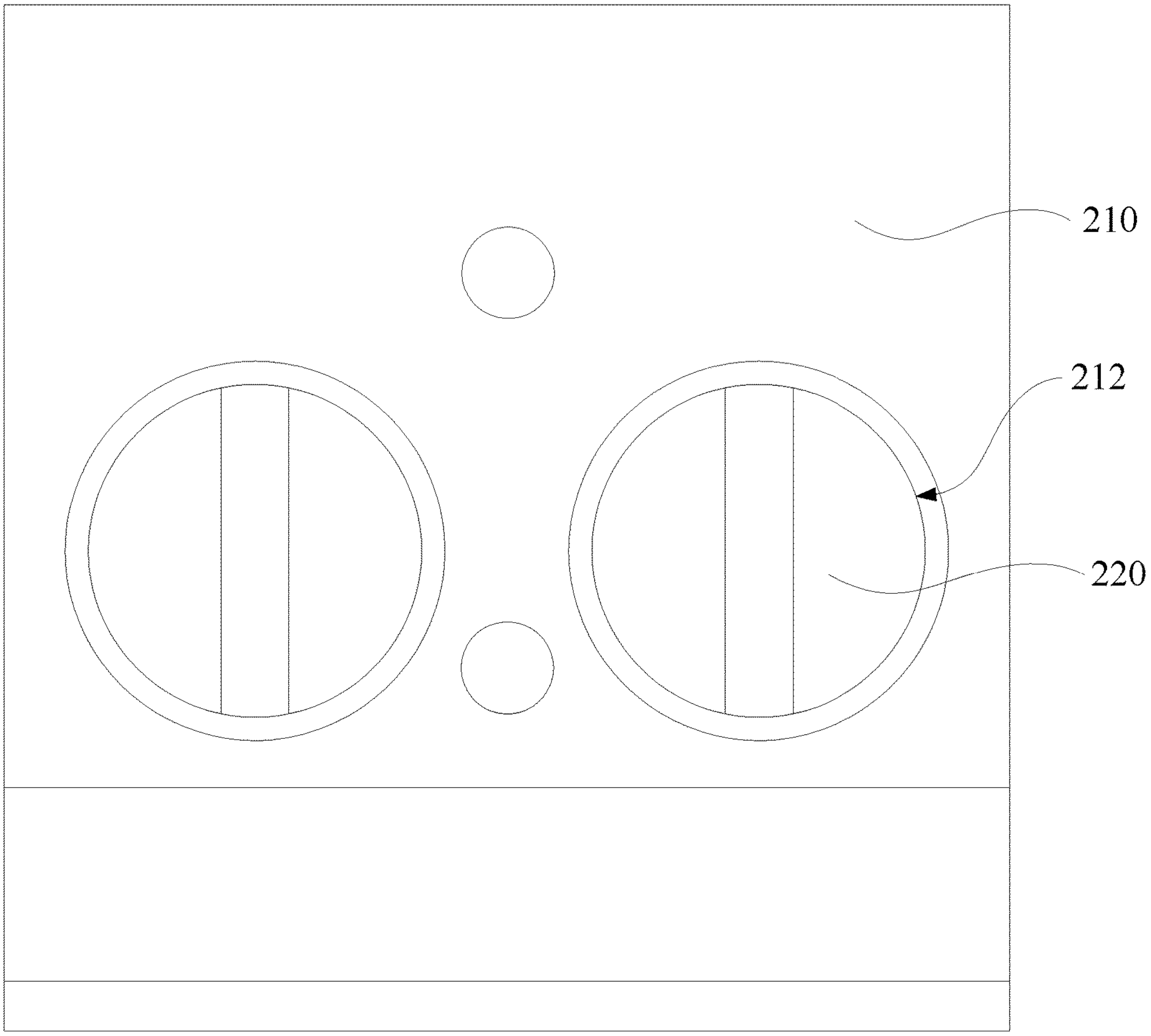
FIG. 4 is another partial schematic structure diagram of the power adaption device illustrated in FIG. 1.

As shown in FIG. 2, in one of the embodiments, the electrical cord assembly 100 comprises an insertion member 110 and a flexible protection member 120. The insertion member 110 is insertable into the insertion hole 211. The flexible protection member 120 is connected to the insertion member 110, and the flexible protection member 120 covers the adjustment hole 212. In the instant embodiment, the flexible protection member 120 is arranged to cover the adjustment hole 212, so as to prevent external contaminants from entering the adjustment hole 212 to avoid an issue of the tightness adjustment member 220 being corroded by the external contaminants to thereby suppress unexpected loosening of the tightness adjustment member 220, and thus suppressing unexpected loosening of the electrical cord assembly 100. It is appreciated that the flexible protection member 220 can be a silicone rubber member, a rubber pad, or other existing flexible members.

As shown in FIG. 2, in one of the embodiments, the adaptor plug assembly 200 further comprises a casing 240. The electrical conduction member 210 is disposed in an interior of the casing 240. The casing 240 is formed with an insertion avoiding hole 241 and an adjustment avoiding hole 242. The insertion avoiding hole 241 is in communication with the insertion hole 211, and the adjustment avoiding hole 242 in communication with the adjustment hole 212. The casing 240 is further formed, in an outside thereof, with a flatness receiving trough 243. The flatness receiving trough 243 is in communication with the adjustment avoiding hole 242, and the flatness receiving trough 243 is configured for receiving the flexible protection member 120 therein, in order to make an outside of the flexible protection member 120 flush with the outside of the casing 240, to thereby improve surface flatness of the power adaption device 10.

In the instant embodiment, the adaptor plug assembly 200 further comprises the casing 240. The electrical conduction member 210 is disposed in the casing 240, so that the casing 240 may function to protect the electrical conduction member 210. The casing 240 is formed with the insertion avoiding hole 241 and the adjustment avoiding hole 242. The insertion avoiding hole 241 functions to prevent the casing 240 from interfering with the insertion of the electrical cord assembly 100 into the insertion hole 211. Specifically, the insertion avoiding hole 241 and the insertion hole 211 are arranged to correspond to each other, and the insertion avoiding hole 241 is in communication with the insertion hole 211. The electrical cord assembly 100 penetrates through the insertion avoiding hole 241, and the electrical cord assembly 100 is inserted into the insertion hole 211. In other words, an end of the electrical cord assembly 100 penetrates through the insertion avoiding hole 241 to then insert into the insertion hole 211. The adjustment avoiding hole 242 functions to prevent the casing 240 from interfering with an operation of a tool, such as a screwdriver, twisting the tightness adjustment member 220. Specifically, the adjustment avoiding hole 242 and the adjustment hole 212 are arranged to correspond to each other, and the adjustment avoiding hole 242 is in communication with the adjustment hole 212. In twisting the tightness adjustment member 220, an end of the tool, such as a screwdriver, is put through the adjustment avoiding hole 242 to connect to the tightness adjustment member 220.

As shown in FIG. 2, further, the flatness receiving trough 243 and the flexible protection member 120 match each other. In other words, the flatness receiving trough 243 has a depth that corresponds to a thickness of the flexible protection member 120, and the flexible protection member 120 is so received in the flatness receiving trough 243 that one side of the flexible protection member 120 that is opposite to the flatness receiving trough 243 is flush with the outside of the casing 240 to prevent an issue that the flexible protection member 120 protrudes out of the casing 240 to thereby reduce the chance that the flexible protection member 120 is unexpectedly opened, and thus enhancing the effect of protection for the flexible protection member 120.

Figure 6:
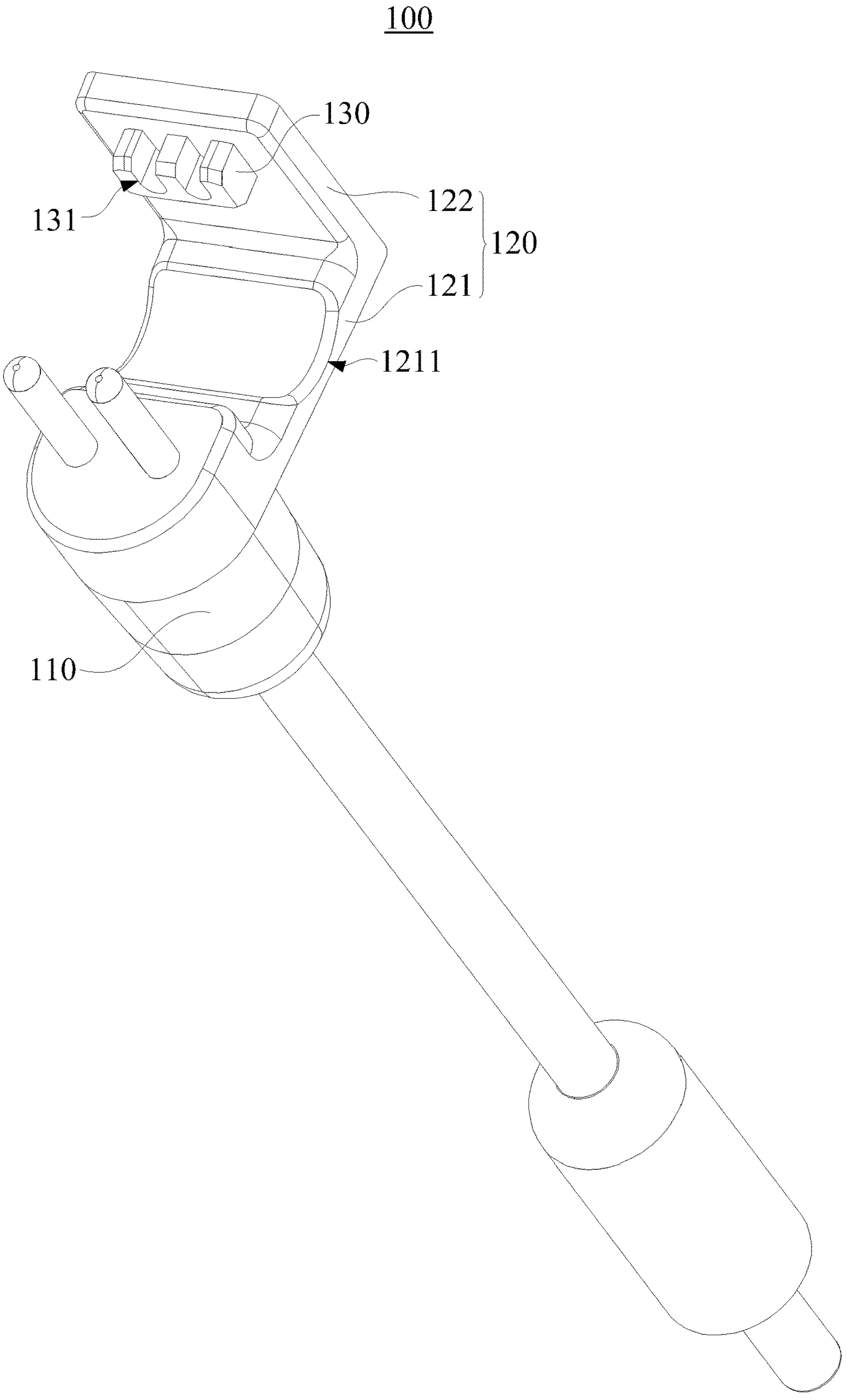
FIG. 6 is a schematic structure diagram of an electrical cord assembly of the power adaption device illustrated in FIG. 1.

As shown in FIG. 6, in one of the embodiments, one side of the flexible protection member 120 that faces the adjustment avoiding hole 242 is protruded to form a fixing portion 130, and the fixing portion 130 is receivable into and connectable with the adjustment avoiding hole 242. In the instant embodiment, the fixing portion 130 is fit into and connected to the adjustment avoiding hole 242, in order to fix the flexible protection member 120 to the casing 240 to improve positional stability of the flexible protection member 120. Further, since the fixing portion 130 is fit into and connected to the adjustment avoiding hole 242, the flexible protection member 120 is connected to the insertion member 110, so that the insertion member 110 is connected, by means of the flexible protection member 120, to the casing 240, to thereby improve the positional stability of the insertion member 110, and thus, enhancing the firmness of the insertion member 110 retained in the insertion hole 211.

As shown in FIG. 6, further, the fixing portion 130 is formed with multiple deformation slots 131. The fixing portion 130, when fit into and connected to the adjustment avoiding hole 242, is deformed into the deformation slots 131 to make the fixing portion 130 match up with the adjustment avoiding hole 242. A reaction force induced by the deformation of the fixing portion 130 acts on an inside wall of the adjustment avoiding hole 242 to improve the positional stability of the fixing portion 130 in the adjustment avoiding hole 242 to thereby enhance the connection stability between the flexible protection member 120 and the casing 210, and thus improving the positional stability of the insertion member 110 and enhancing the firmness of the insertion member 110 in the insertion hole 211.

In one of the embodiments, an opening of the adjustment avoiding hole 242 is formed with guide chamfering, so that the adjustment avoiding hole 242 is gradually expanded in a fitting direction of the fixing portion 130, so that the guide chamfering provides an effect of guiding the fixing portion 130 into the adjustment avoiding hole 242 to form a connection, thereby enhancing easiness of the fixing portion 130 fit into and connected to the adjustment avoiding hole 242.

As shown in FIG. 6, in one of the embodiments, the flexible protection member 120 comprises a connection portion 121 and a cover portion 122. An end of the connection portion 121 is connected to the insertion member 110. The connection portion 121 is receivable in the flatness receiving trough 243, and an outside of the connection portion 121 is flush with the outside of the casing 240 to improve surface flatness of the power adaption device 10. The cover portion 122 is connected to an opposite end of the connection portion 121. The cover portion 122 is set on and covers the adjustment hole 212. In the instant embodiment, the two ends of the connection portion 121 are respectively connected with the insertion member 110 and the cover portion 122, and the cover portion 122 is set on and covers the adjustment hole 212 to avoid an issue of external contaminants entering the adjustment hole 212. The cover portion 122 is also receivable in the flatness receiving trough 243, and an outside of the cover portion 122 is flush with the outside of the casing 240 to improve surface flatness of the power adaption device 10.

As shown in FIG. 6, in one of the embodiments, the connection portion 121 is formed with a flexing zone 1211. Flexing the connection portion 121 allows the cover portion 122 to be lifted and opened from the flatness receiving trough 243, so that the connection portion 121 necessarily features better flexibility. In order to improve the flexibility of the connection portion 121, in the instant embodiment, the connection portion 121 is formed with the flexing zone 1211 to reduce the strength of the connection portion 121 to improve the flexibility of the connection portion 121 in order to make the connection portion 121 deformable in a relatively easy way thereby improve easiness of a manual operation for lifting and opening the cover portion 122. When the cover portion is pulled in a direction away from the tightness adjustment member, since the connection portion is formed with the flexing zone, the portion of the connection portion in which the flexing zone is formed is easier to deform, making it easy to pull the cover portion. After the cover portion is loosened, the portion of the connection portion in which the flexing zone is formed is elastically restored, so as to allow the cover portion to remain covering the adjustment hole.

As shown in FIG. 6, in one of the embodiments, the flexing zone 1211 is made in the form of a through slot to reduce the strength of the connection portion 121 so as to improve the flexibility of the connection portion 121. Further, the flexing zone 1211 is made in the form of an arc slot structure, and the flexing zone 1211 is arranged to face the adaptor plug assembly 200, so that a portion of the connection portion 121 that is adjacent to the cover portion 122 and a portion thereof that is adjacent to the insertion member 110 are of an increased thickness, so that while the flexibility of the connection portion 121 is enhanced, the strength of connection of the connection portion 121 with the cover portion 122 is not reduced and the strength of connection of the connection portion 121 with the insertion member 110 is not reduced, to thereby ensure a normal operation of the flexible protection member 120.

Of course, in other embodiments, the flexing zone 1211 can be a blind hole, a through hole, a notch, or other structures that help reduce the strength of the connection portion 121.

As shown in FIG. 6, in one of the embodiments, the flexing zone 1211 is formed in one side of the connection portion 121 that is adjacent to the tightness adjustment member 220, in order to improve the flatness of an exposed surface of the flexible protection member 120.

As shown in FIG. 6, in one of the embodiments, an included angle between the connection portion and the cover portion is 90°. In other words, an included angle between a plane of extension of the connection portion and a plane of extension of the cover portion is 90°, in order to have the connection portion 121 and the cover portion 122 respectively covering two adjacent side surfaces of the casing 240.

As shown in FIG. 6, in one of the embodiments, the connection portion 121 and the cover portion 122 are both a plastic structure. Further, the connection portion 121 and the cover portion 122 are of an integrated, one-piece, structure, in order to enhance the connection strength between the connection portion 121 and the cover portion 122.

Figure 7:
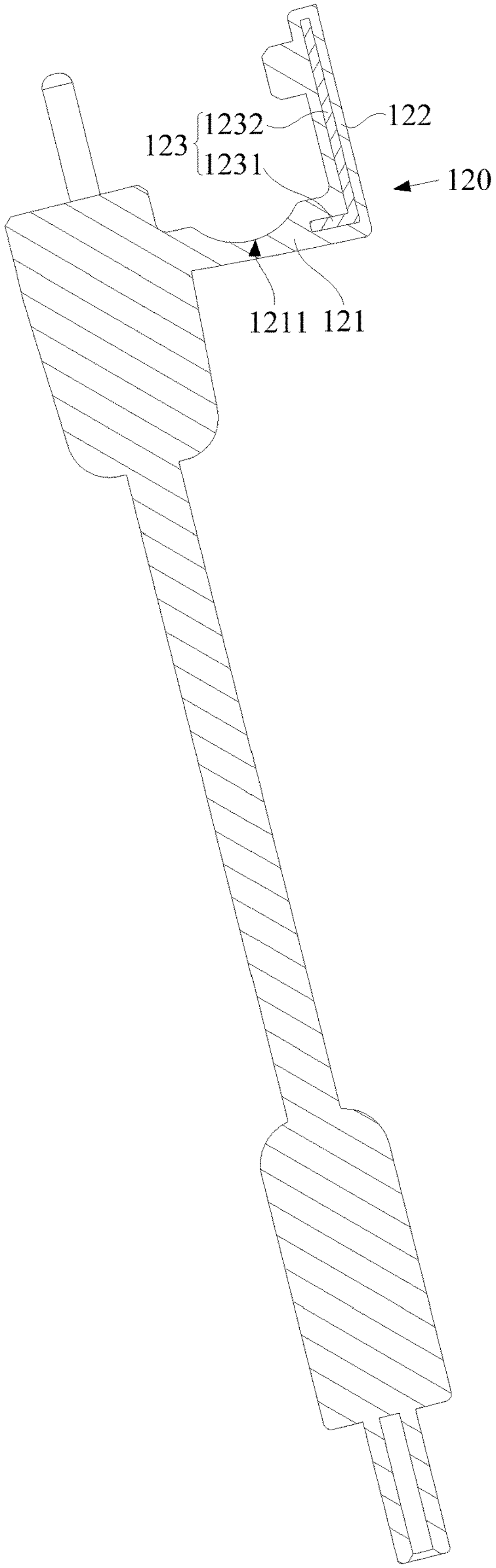
FIG. 7 is a cross-sectional diagram of the electrical cord assembly of the power adaption device illustrated in FIG. 1.

As shown in FIG. 7, in one of the embodiments, the flexible protection member 120 further comprises a warp-preventing steel plate 123. The connection portion 121 and the cover portion 122 jointly enclose and connect with the warp-preventing steel plate 123, and the warp-preventing steel plate 123 and the flexing zone are staggered in a direction of extension of the cover portion 122, such that a portion of the flexible protection member 120 that is not formed with the flexing zone 1211 encloses and connects with the warp-preventing steel plate 123. In other words, a portion of the flexible protection member 120 that does not need to deform encloses and connects with the warp-preventing steel plate 123. In the instant embodiment, since the portion of the flexible protection member 120 that does not need to deform encloses and connects with the warp-preventing steel plate 123 to prevent deforming of the portion of the flexible protection member 120 that does not need to deform, an issue of warping occurring on the flexible protection member 120 is avoided to thereby prevent the flexible protection member 120 from warping away from the casing 240, and thus enhancing flatness of the power adaption device 10.

As shown in FIG. 7, further, the warp-preventing steel plate 123 is enclosed in and connected to the connection portion 121 and the cover portion 122 by means of in-mold injection molding, so that the structure of the flexible protection member 120 is smooth and aesthetic, and also to have the end of the cover portion 122 connected to the connection portion 121 and the connection portion 121 both exhibiting better structural strength. Further, the warp-preventing steel plate 123 comprises a first steel plate 1231 and a second steel plate 1232. The first steel plate 1231 and the second steel plate 1232 are fixedly connected. The first steel plate 1231 is enclosed in and connected with the connection portion 121, and the second steel plate 1232 is enclosed in and connected with the cover portion 122.

As shown in FIG. 7, further, an included angle between a plane of extension of the first steel plate 1231 and a plane of extension of the second steel plate 1232 is 90°. Further, a length of the first steel plate 1231 is less than a length of the second steel plate 1232, making the warp-preventing steel plate 123 be L-shaped.

Figure 8:
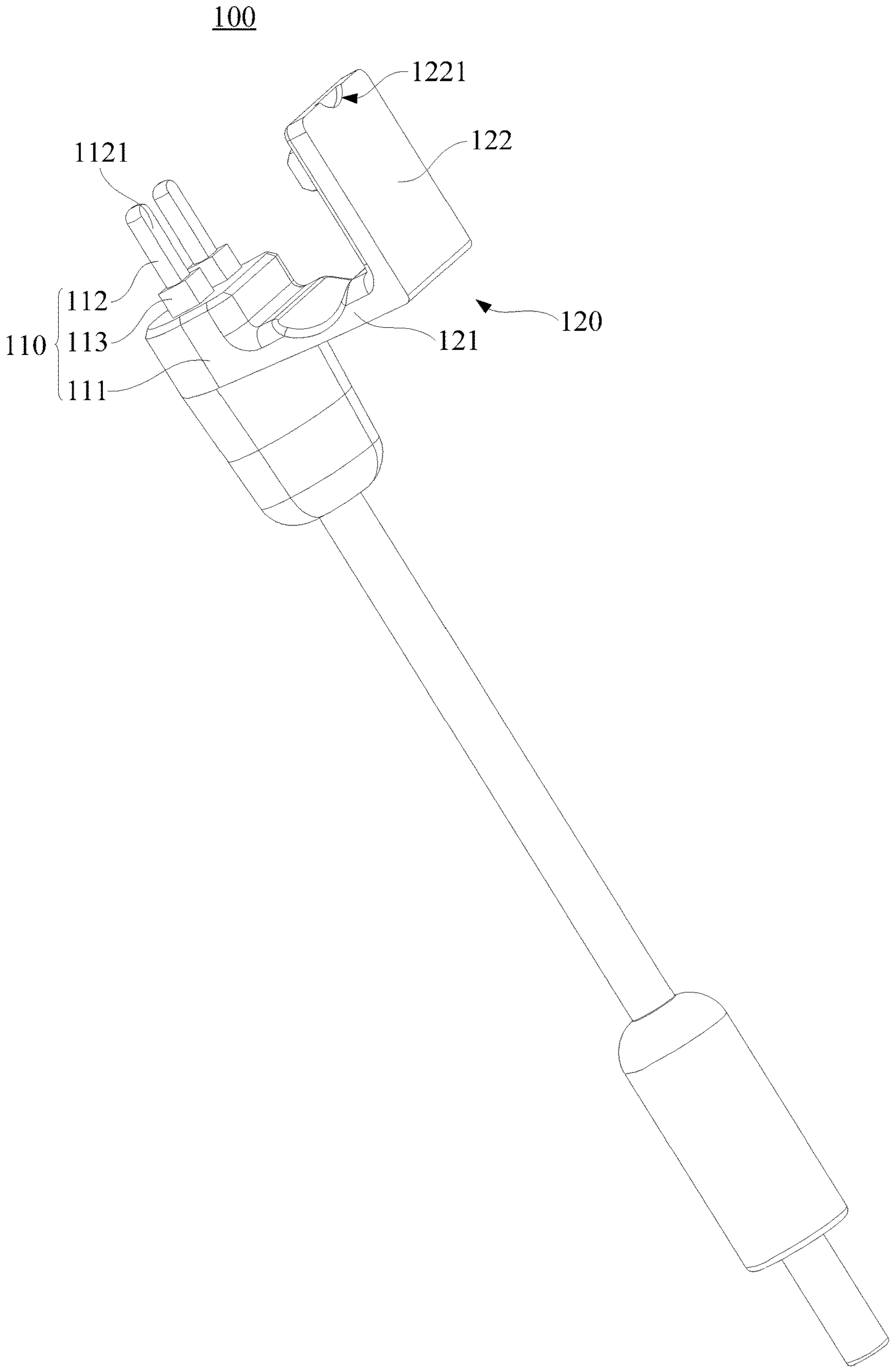
FIG. 8 is a cross-sectional diagram of an electrical cord assembly of a power adaption device according to another embodiment.

As shown in FIG. 8, in one of the embodiments, one side of the cover portion 122 that is opposite to the adjustment avoiding hole 242 is formed with a lifting notch 1221. In the instant embodiment, to lift and open the cover portion 122, a finger is extended into the lifting notch 1221 to lift and open the cover portion 122, this enhancing the easiness of lifting and opening the cover portion 122 from the casing 240, meaning enhancing the easiness of exposing the tightness adjustment member 220, to thereby enhance the easiness of adjusting the tightness adjustment member 220.

As shown in FIGS. 5 and 8, in one of the embodiments, the insertion hole 211 is a square hole. The insertion member 110 comprises an insertion body 111, an insertion pin 112, and a stabilization piece 113. The insertion body 111 is connected to the flexible protection member 120. The insertion pin 112 has a portion located inside the insertion body 111 and connected with the insertion body 111, and the insertion pin 112 has another portion insertable into the insertion hole 211. The stabilization piece 113 is sleeved over the insertion pin 112. The stabilization piece 113 is a square block that matches the insertion hole 211, and the stabilization piece 113 is located in the insertion hole 211. In the instant embodiment, when the insertion member 110 is inserted into the insertion hole 211, the insertion member 110 is constrained in position by a hole wall of the insertion hole 211. Specifically, when the insertion pins 112 is inserted into the insertion hole 211, the stabilization piece 113 is located in the insertion hole 211. Since the stabilization piece 113 is a square block and the insertion hole 113 is a square hole, and the stabilization piece 113 and the insertion hole 113 match with each other, the hole wall of the insertion hole 211 constrains the stabilization piece 113 from rotating so as to constrain the insertion member 110 from rotating thereby improving positional stability of the insertion member 110 in the insertion hole 211 and thus improving firmness of connection between the electrical cord assembly 100 and the adaptor plug assembly 200 to further avoid an issue that the electrical cord assembly 100 and the adaptor plug assembly 200 are unexpectedly separated.

As shown in FIG. 8, further, one side of the insertion pin 112 that is adjacent to the pre-fixing spring plate 230 is provided with a constraint plane 1121, and the second elastic portion of the pre-fixing spring plate 230 engages with and abuts the constraint plane 1121. By means of the abutting engagement between the constraint plane 1121 of the insertion pin 112 and the second elastic portion, a force application area of the insertion pin 112 is increased to thereby improve the positional stability of the insertion pins 112, and thus enhance the firmness of connection between the electrical cord assembly 100 and the adaptor plug assembly 200.

In one of the embodiments, the flexible protection member 120 further comprises a first reinforcing rib and a second reinforcing rib. The first reinforcing rib is connected to the connection between the connection portion 121 and the cover portion 122, and the second reinforcing rib is connected to the connection between the connection portion 121 and the insertion member 110. In the instant embodiment, due to the first reinforcing rib being connected to the connection between the connection portion 121 and the cover portion 122, the connection strength of the connection portion 121 and the cover portion 122 is increased and an issue of the flexible protection member 120 breaking at the connection between the connection portion 121 and the cover portion 122 can be prevented to thereby improve the positional stability of the insertion member 110 and thus enhancing the firmness of the insertion member 110 retained in the insertion hole 211. Due to the second reinforcing rib being connected to the connection between the connection portion 121 and the insertion member 110, the connection strength of the connection portion 121 and the insertion member 110 is increased and an issue of the flexible protection member 120 breaking at the connection between the connection portion 121 and the insertion member 110 can be prevented to thereby improve the positional stability of the insertion member 110 and thus enhancing the firmness of the insertion member 110 retained in the insertion hole 211.

As shown in FIGS. 9-12, in a further embodiment, the electrical cord assembly 100 further comprises a magnetic attraction member 140. The magnetic attraction member 140 is connected to the flexible protection member 120. The magnetic attraction member 140 is extendable through the adjustment avoiding hole 242, and the magnetic attraction member 140 is receivable in the adjustment hole 212 to magnetically attract and connect to the tightness adjustment member 220. In the instant embodiment, the tightness adjustment member 220 is made of a ferrous material, and when the flexible protection member 120 is set on and covers the adjustment hole 212, the magnetic attraction member 140 is partly located in the adjustment hole 212 to attractively connect to the tightness adjustment member 220 to improve the stability of the flexible protection member 120 being set on and covering the adjustment hole 212 and also preventing the flexible protection member 120 from protruding from the casing 240 to thereby improve the surface flatness of the power adaption device 10.

Figure 9:
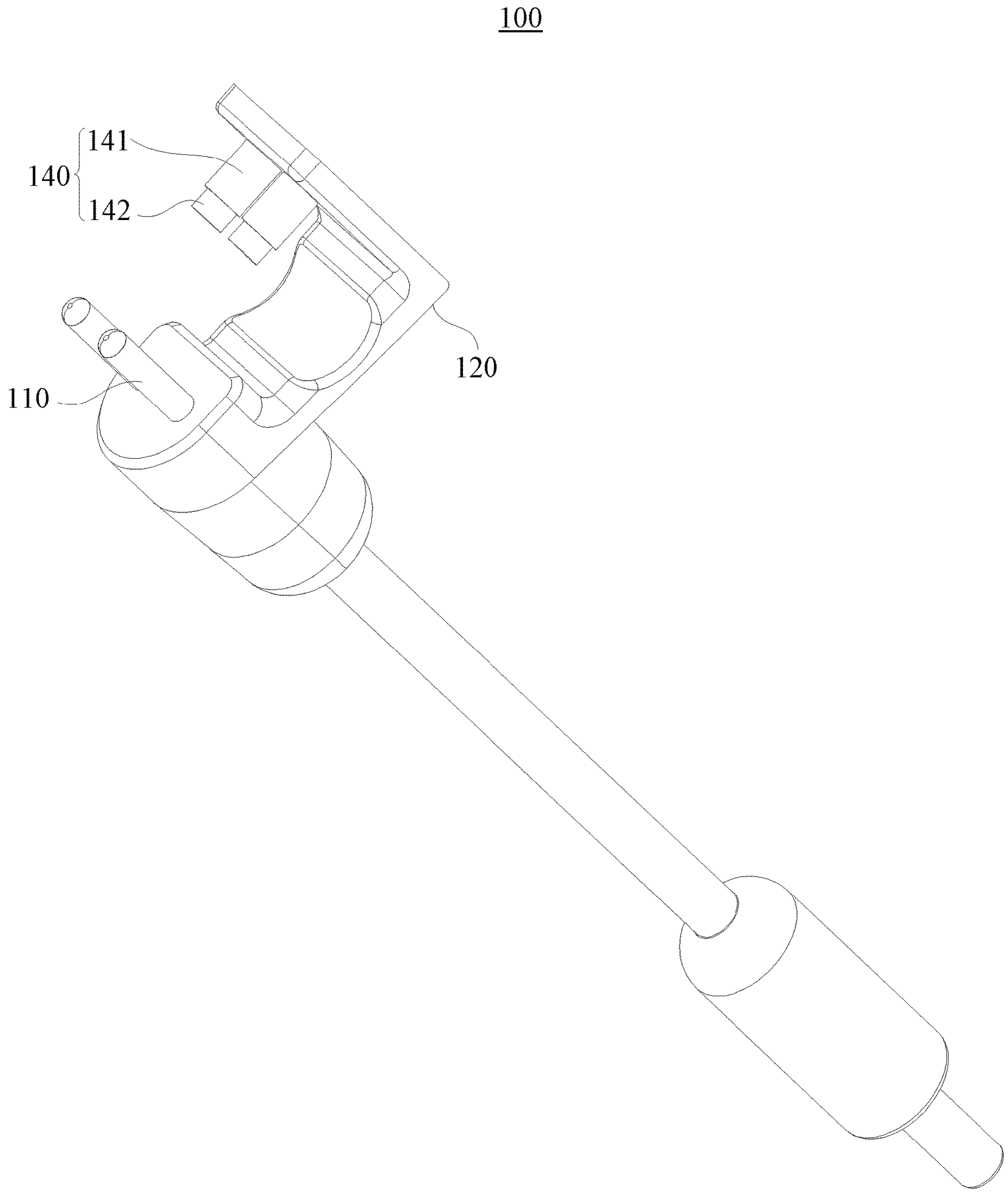
FIG. 9 is a cross-sectional diagram of an electrical cord assembly of a power adaption device according to a further embodiment.
Figure 10:
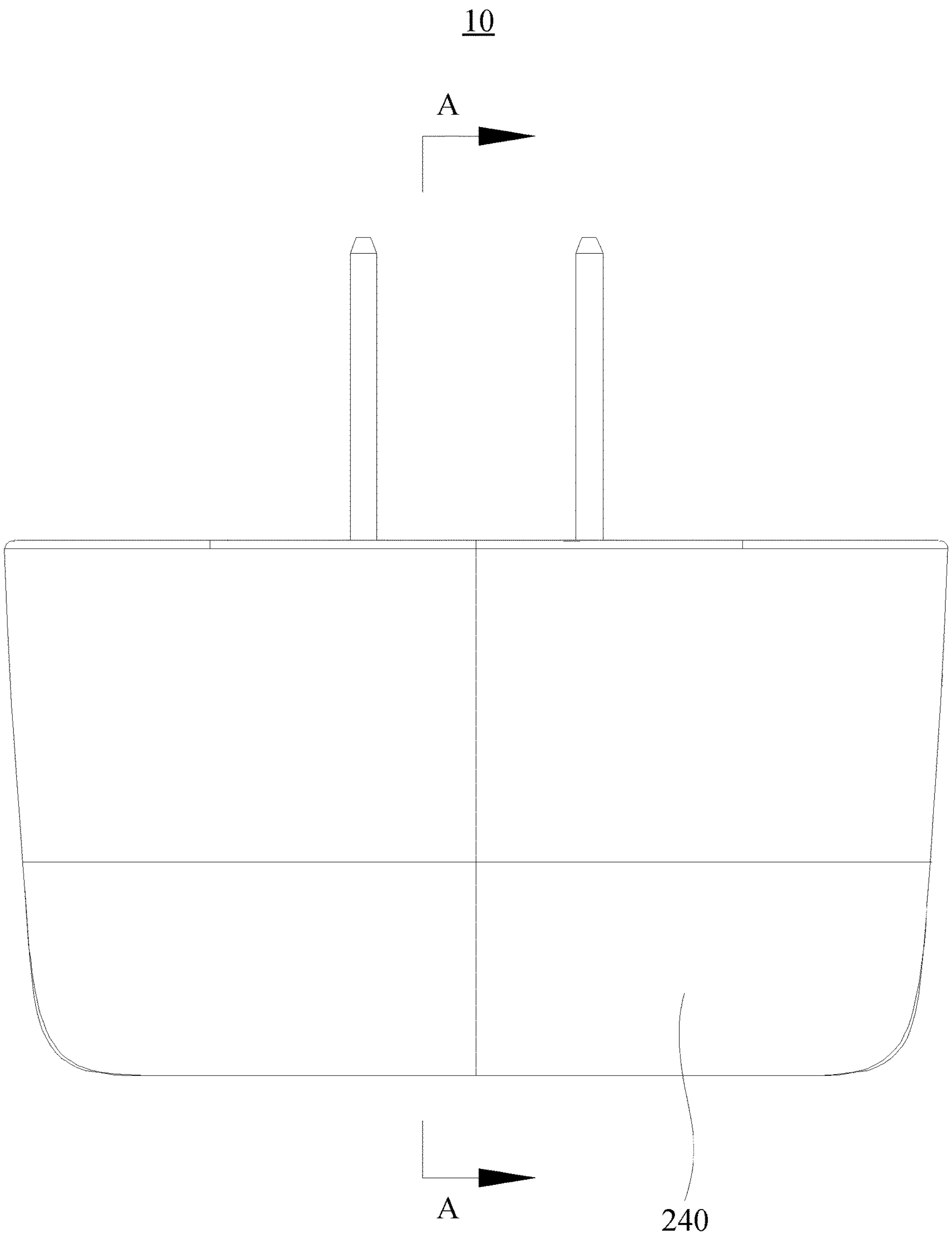
FIG. 10 is a schematic structure diagram of the power adaption device illustrated in FIG. 9.
Figure 11:
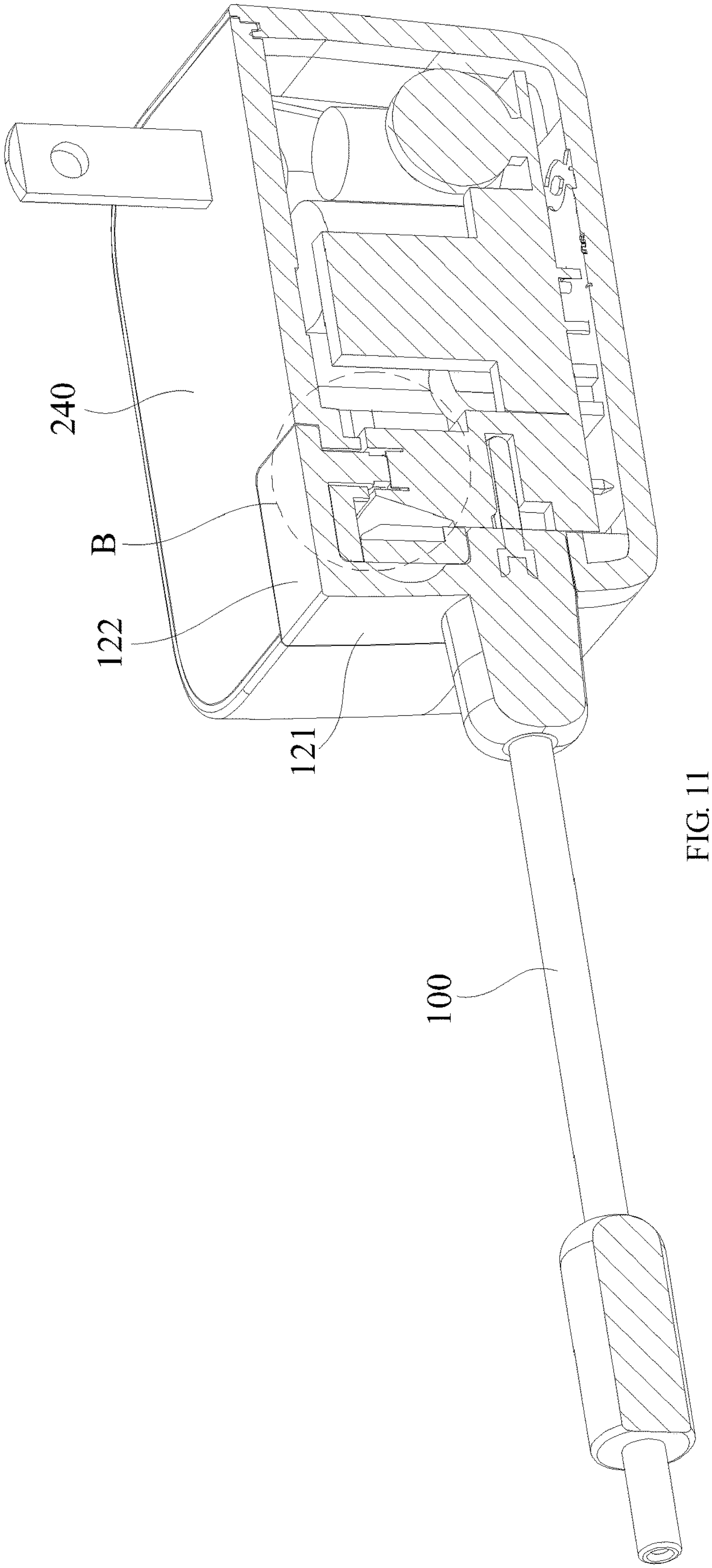
FIG. 11 is a cross-sectional view of the power adaption device illustrated in FIG. 10 taken along line A-A.
Figure 12:
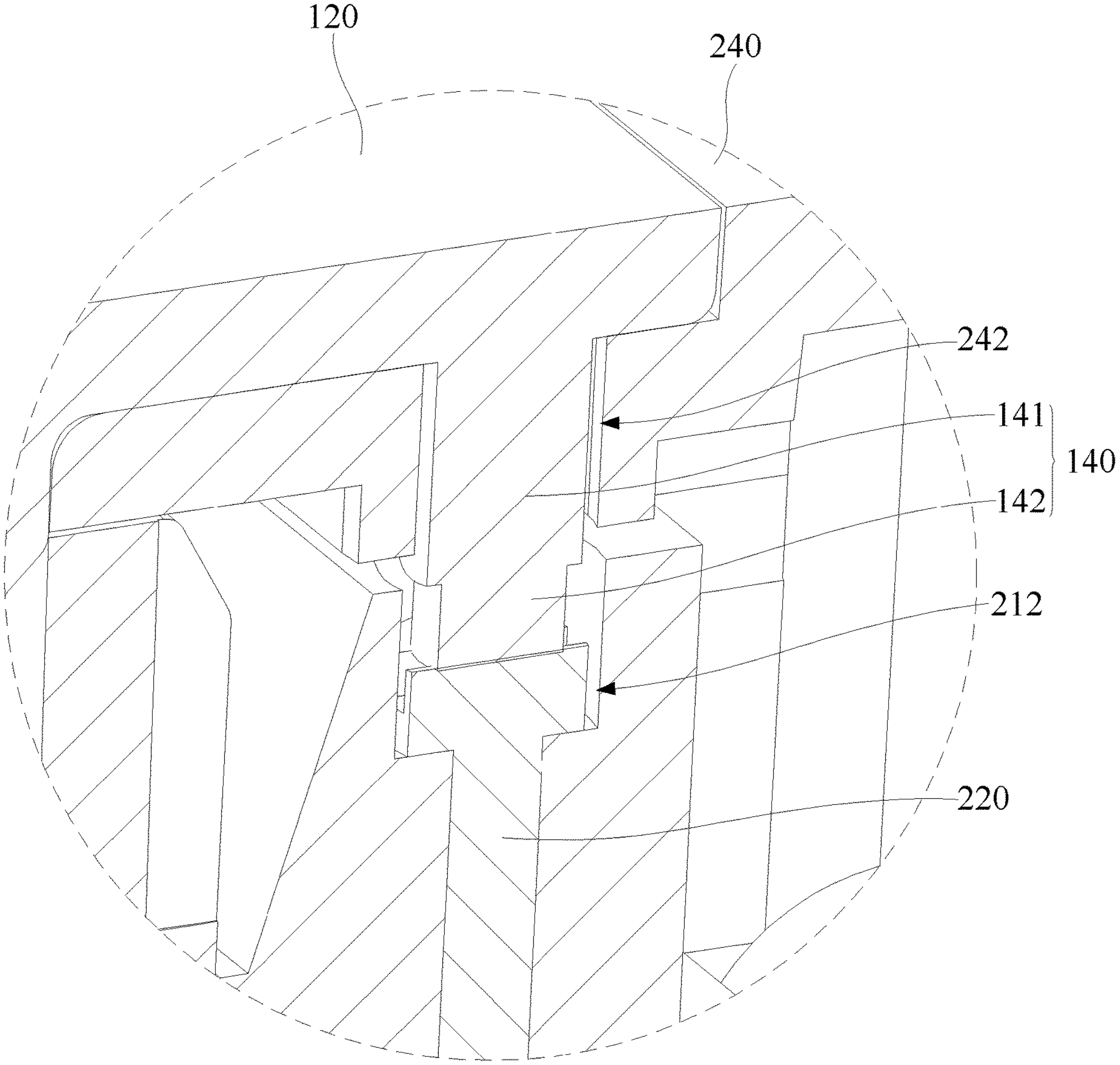
FIG. 12 is a schematic enlarged diagram showing part B of the power adaption device illustrated in FIG. 11.

As shown in FIGS. 9 and 12, further, the magnetic attraction member 140 comprises a flexible portion 141 and a magnet 142. A first end of the flexible portion 141 is securely connected to the flexible protection member 120, and the flexible portion 141 is penetrable into the adjustment avoiding hole 242. The magnet 142 is securely connected to a second end of the flexible portion 141, and the magnet 142 is located in the adjustment hole 212 to attractively connect to the tightness adjustment member 220. In the instant embodiment, the magnet 142 is connected, by means of the flexible portion 141, to the flexible protection member 12, and the flexible portion 141 is of a flexible structure, so that the flexible portion 141 exhibits improved flexibility to allow the magnet 142 to more easily penetrate through the adjustment avoiding hole 242 to enter into the adjustment hole 212 to attractively connect to the tightness adjustment member 220.

Figure 13:
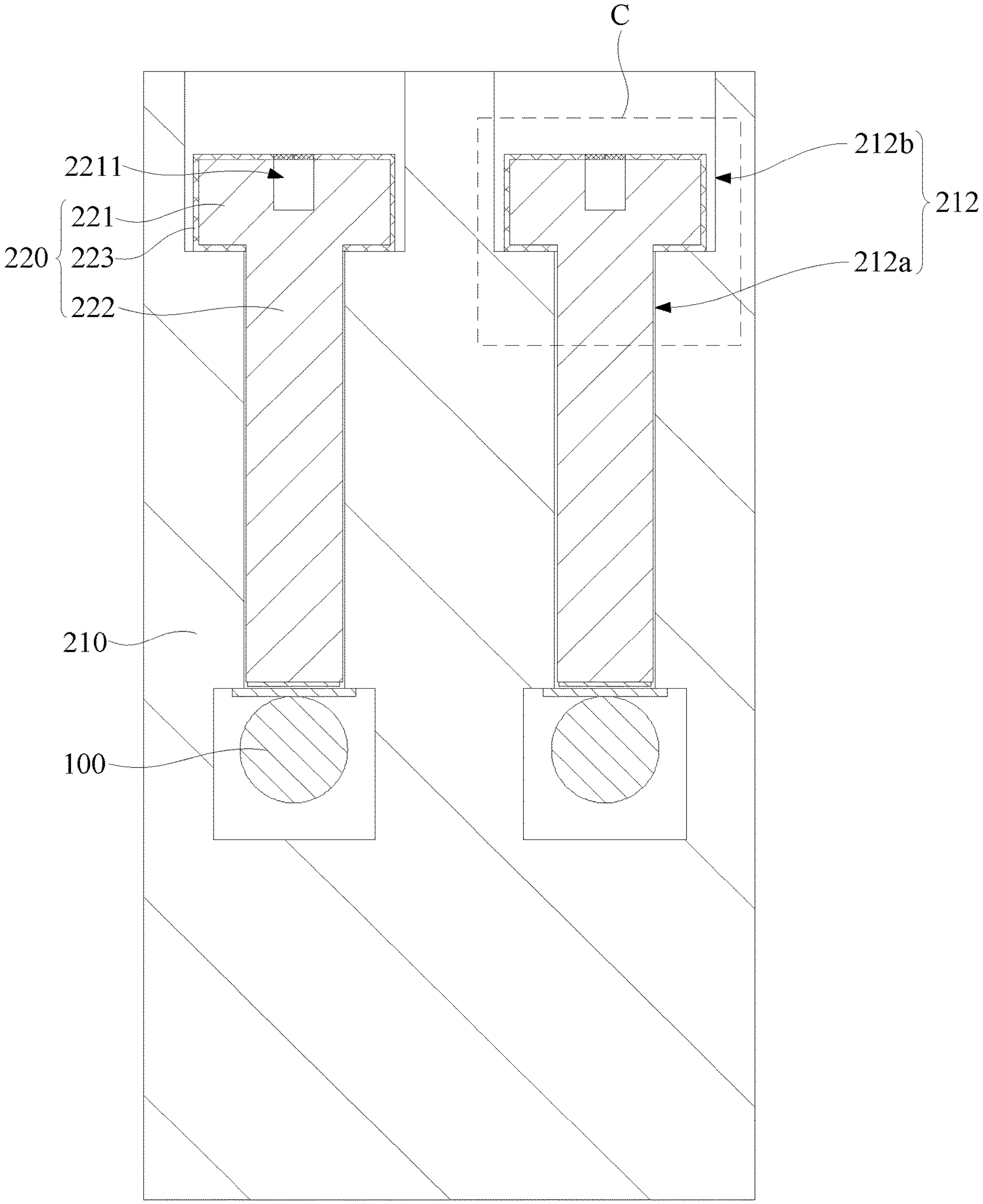
FIG. 13 is a partial cross-sectional view of the power adaption device illustrated in FIG. 1.

As shown in FIG. 13, in one of the embodiments, the adjustment hole 212 comprises a threaded hole 212*a* and a receptacle hole 212*b*, and the threaded hole 212*a* is in communication with the receptacle hole 212*b*. The tightness adjustment member 220 comprises an operating end portion 221 and a threaded rod 222. The threaded rod 222 is screwed into and connected in the threaded hole 212*a* to abut the electrical cord assembly 100. In other words, the threaded rod 222 is located in the threaded hole 212*a* and is connected through threading engagement with the electrical conduction member 210, and a second end of the threaded rod 222 is put in abutting engagement with the electrical cord assembly 100. The operating end portion 221 is fixedly connected to a first end of the threaded rod 222. The operating end portion 221 protrudes at an outside of the threaded rod 222, and the operating end portion 221 abuts a hole wall of the receptacle hole 212*b*. One side of the operating end portion 221 that is opposite to the threaded rod 222 is formed with a linear slot 2211, and the linear slot 2211 functions to receive a flat-head screwdriver to insert therein, so that the flat-head screwdriver may be inserted into the linear slot 2211 to twist the tightness adjustment member 220.

As shown in FIGS. 2 and 13, further, the receptacle hole 212*b* is in communication with the adjustment avoiding hole 242. Further, the threaded rod 222 is screwed into and connected in the threaded hole 212*a* to abut the pre-fixing spring plate 230. And, further, the threaded rod 222 is in abutting engagement with the first elastic portion.

It is appreciated that after the power adaption device 10 has been dropping down to the ground or has been hit multiple times, the tightness adjustment member 220 may suffer an issue of loosening due to vibration and shock, specifically the threaded rod 222 gets loosened, so that it needs to periodically twist tight the tightness adjustment member 220 to ensure the tightness adjustment member 220 is kept in a tightened condition so as to ensure the firmness of connection between the electrical cord assembly 100 and the adaptor plug assembly.

Figure 14:
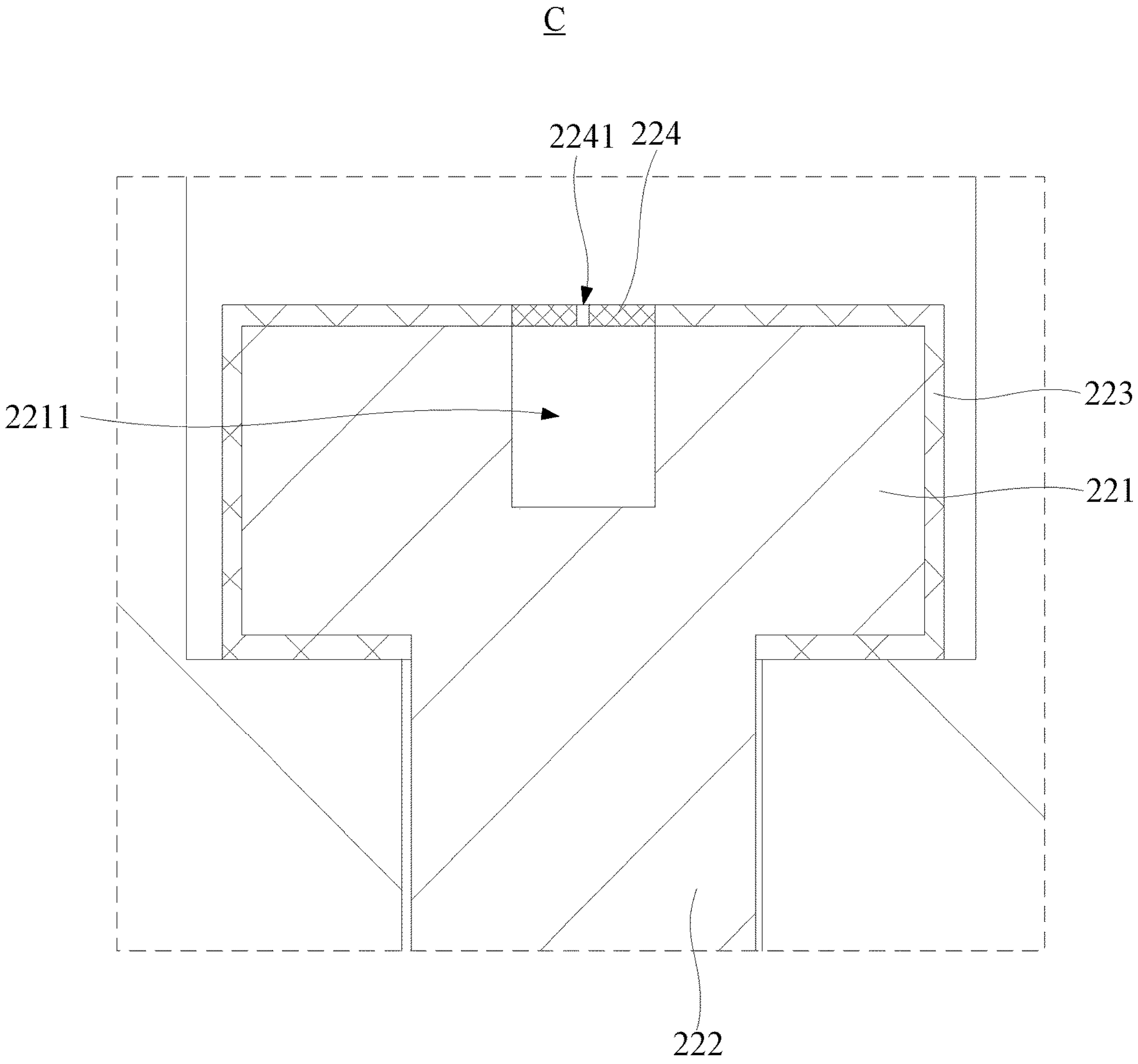
FIG. 14 is a schematic enlarged diagram showing part C of the power adaption device illustrated in FIG. 13.

However, constantly twisting tight the tightness adjustment member 220 would deteriorate the easiness of use of the power adaption device 10, and thus, as shown in FIG. 14, in one of the embodiments, the tightness adjustment member 220 further comprises an elastic covering layer 223. The elastic covering layer 223 encloses and connects with a surface of the operating end portion 221. The elastic covering layer 223 is set in abutting engagement with the operating end portion 221 and a hole wall of the receptacle hole 212*b*, so that the operating end portion 221 is kept in abutting engagement with the hole wall of the receptacle hole 212*b* via the elastic covering layer 223. Further, the elastic covering layer 223 is formed with a linear avoiding hole 2231. The linear avoiding hole 2231 is arranged to correspond to the linear slot 2211 of the operating end portion 221, in order to prevent the elastic covering layer 223 from interfering with the penetration of the flat-head screwdriver into the linear slot 2211.

As shown in FIG. 14, in the instant embodiment, the elastic covering layer 223 is in abutting engagement with both the operating end portion 221 and the hole wall of the receptacle hole 212*b*, and due to the elasticity of the elastic covering layer 223, the elastic covering layer 223 may relieve vibration or shock of the operating end portion 221 and the threaded rod 222, so as to suppress the issue of the threaded rod 222 getting loosened, and thus suppressing the loosening issue of the tightness adjustment member 220. Further, the elastic covering layer 223 encloses and connects with the surface of the operating end portion 221, so that the elastic covering layer 223 may isolate moisture from contacting the surface of the operating end portion 221 to thereby prevent an issue of corrosion of the operating end portion 221 and prevent an issue of peeling of the operating end portion 221, to thereby prevent an issue of gap between the operating end portion 221 and the hole wall of the receptacle hole 212*b*, and thus suppressing the issue of loosening of the tightness adjustment member 220.

As shown in FIG. 14, further, the operating end portion 221 is set on and covers the adjustment hole 212, and the elastic covering layer 223 is set on and covers the adjustment hole 212. In the instant embodiment, the elastic covering layer 223 is in abutting engagement with both the operating end portion 221 and the hole wall of the receptacle hole 212*b*, and the elastic covering layer 223 has elasticity, so that the elastic covering layer 223 achieves an effect of sealing the adjustment hole 212 to prevent moisture from entering the adjustment hole 212 by way of the receptacle hole 212*b* to corrode the threaded rod 222, so as to suppress an issue of corroding of the threaded rod 222, and thus suppressing the issue of loosening of the tightness adjustment member 220.

Further, the elastic covering layer 223 is of a silicone rubber structure, so as to provide the elastic covering layer 223 with elasticity and sealing effect. However, in other embodiments, the elastic covering layer 223 can be of a rubber structure or other existing cladding structure featuring elasticity.

It is appreciated that due to the linear avoiding hole 2231 formed in the elastic covering layer 223, moisture may pass through the linear avoiding hole 2231 to contact the operating end portion 221 and thus causing a risk that the operating end portion 221 may get corroded to make it hard for a screwdriver to twist the operating end portion 221.

As shown in FIG. 14, in one of the embodiments, the tightness adjustment member 220 further comprises a moisture protection cotton body 224. The moisture protection cotton body 224 is disposed in the linear avoiding hole 2231 and connected with the elastic covering layer 223. In the instant embodiment, when the atmosphere is damp, due to an effect of isolation achieved with the moisture protection cotton body 224, contact of the operating end portion 221 with the moisture in the atmosphere is reduced so as to reduce the chance of corrosion of the operating end portion 221 and extend the service life of the operating end portion 221. It is noted that since the moisture protection cotton body 224 is a soft wadding object, even the moisture protection cotton body 224 blocks the linear avoiding hole 2231, a flat-head screwdriver is still capable of penetrating through the moisture protection cotton body 224 to get into the linear slot 2211.

As shown in FIG. 14, further, the flat-head screwdriver, when penetrating into the linear slot 2211, is caused to contact with the moisture protection cotton body 224, so that the moisture protection cotton body 224 may absorb off moisture carried on a surface of the flat-head screwdriver to prevent the flat-head screwdriver from carrying moisture into the linear slot 2211, so as to reduce the chance of corrosion of the operating end portion 221.

As shown in FIG. 14, further, the moisture protection cotton body 224 is formed with a cotton body avoiding hole 2241, and the cotton body avoiding hole 2241 is arranged to correspond to the linear slot 2211. In the instant embodiment, when it needs to twist the tightness adjustment member 220, the flat-head screwdriver penetrates through the cotton body avoiding hole 2241 and is thus caused to contact with the moisture protection cotton body 224, and then reaches into the linear slot 2211 and contacts the operating end portion 221, and then, the flat-head screwdriver can be rotated. Due to the cotton body avoiding hole 2241 formed in the moisture protection cotton body 224, the resistance of the moisture protection cotton body 224 against the flat-head screwdriver can be reduced to thereby increase the resistance against the flat-head screwdriver entering the linear slot 2211 and enhancing the easiness of twisting of the tightness adjustment member 220. Further, since the flat-head screwdriver has to contact the moisture protection cotton body 224 before entering the linear slot 2211, the moisture protection cotton body 224 may intercept contaminants on the flat-head screwdriver to prevent foreign objects from entering the linear slot 2211, and thus suppressing an issue of jamming of the linear slot 2211.

In one of the embodiments, the moisture protection cotton body 224 is connected to the elastic covering layer 223 by means of a layer of adhesive. In the instant embodiment, when the moisture protection cotton body 224 fails its function, the moisture protection cotton body 224 can be peeled off the elastic covering layer 22, and then, a new, replacement moisture protection cotton body 224 is adhered back to the elastic covering layer 223 to keep the effectiveness of the moisture protection cotton body 224 of the tightness adjustment member 220.

Figure 15:
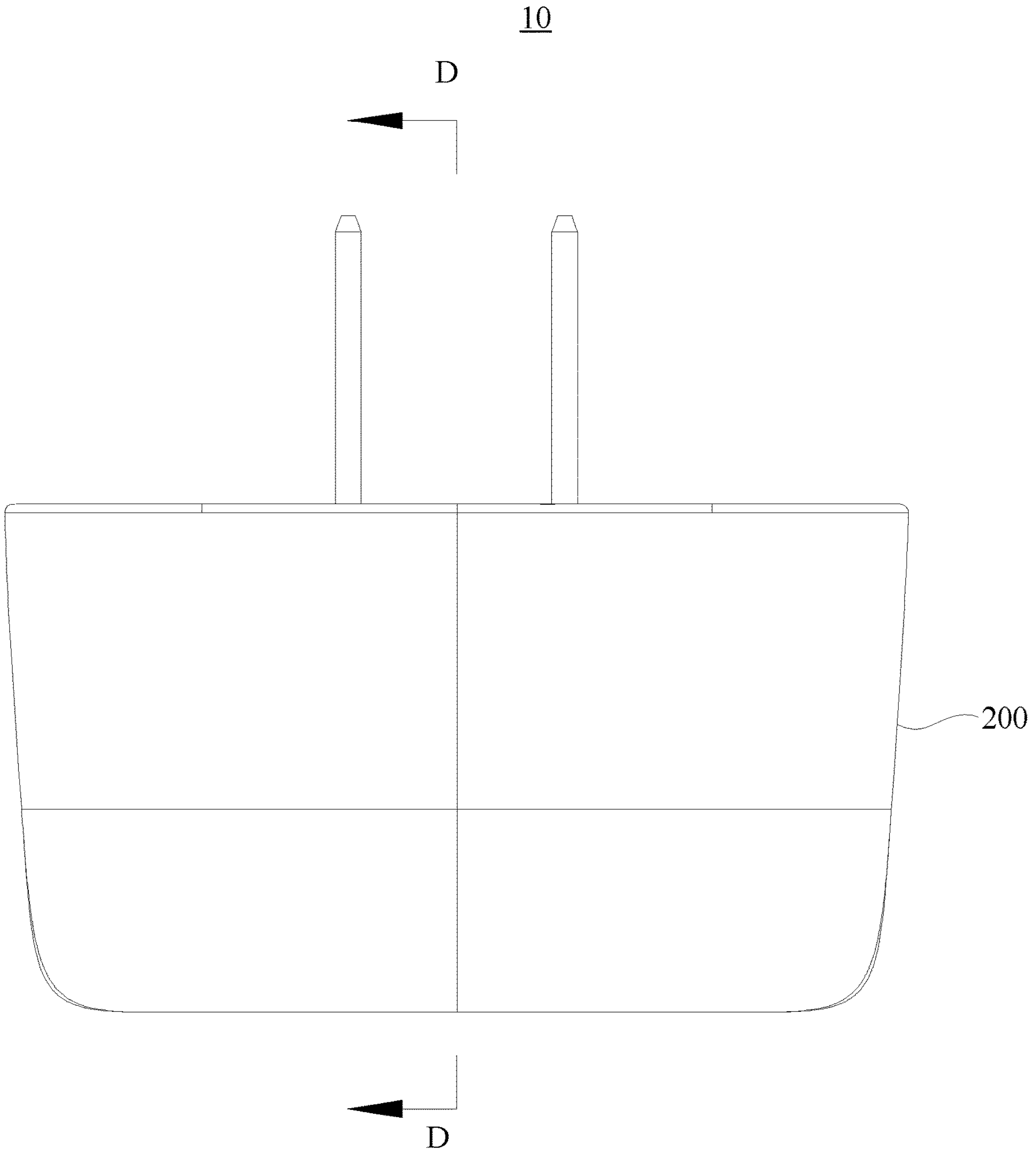
FIG. 15 is a schematic structure diagram of the power adaption device illustrated in FIG. 13.
Figure 16:
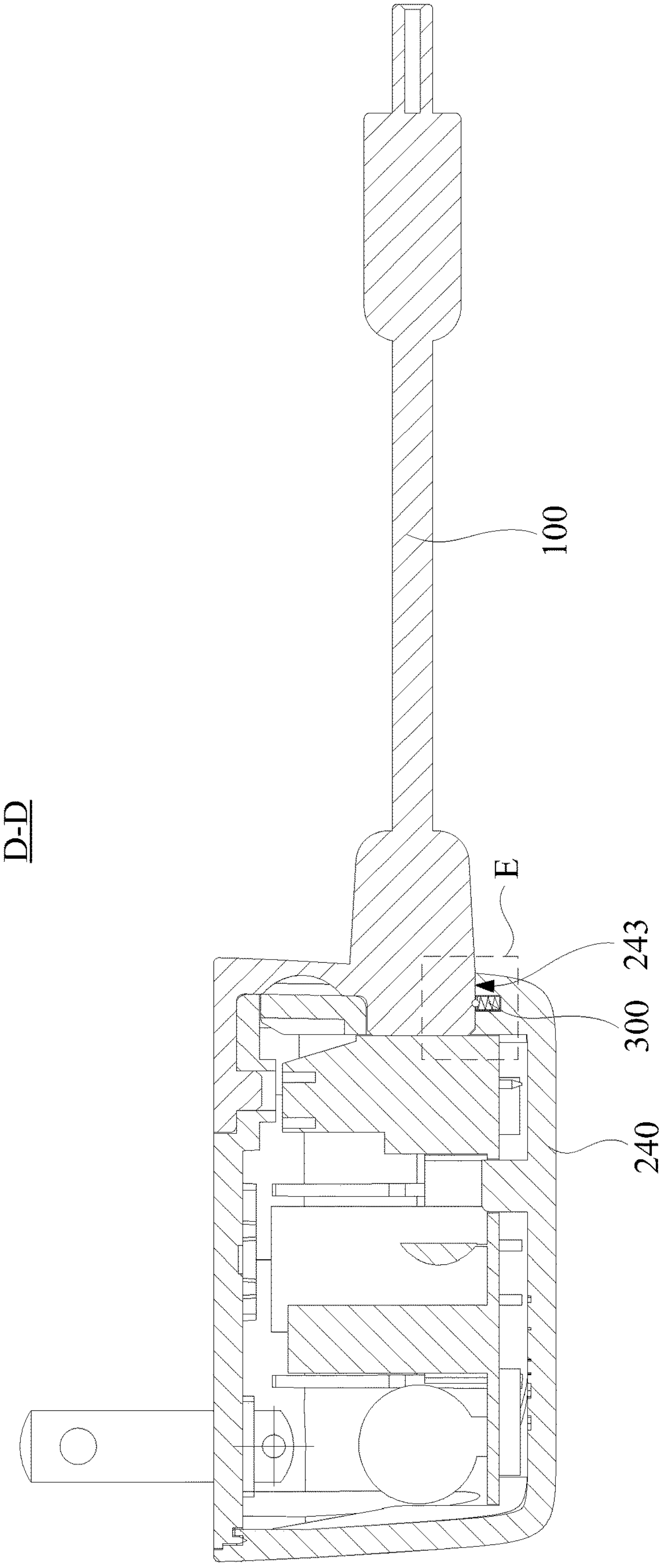
FIG. 16 is a cross-sectional diagram of the power adaption device illustrated in FIG. 15 taken along line D-D.
Figure 17:
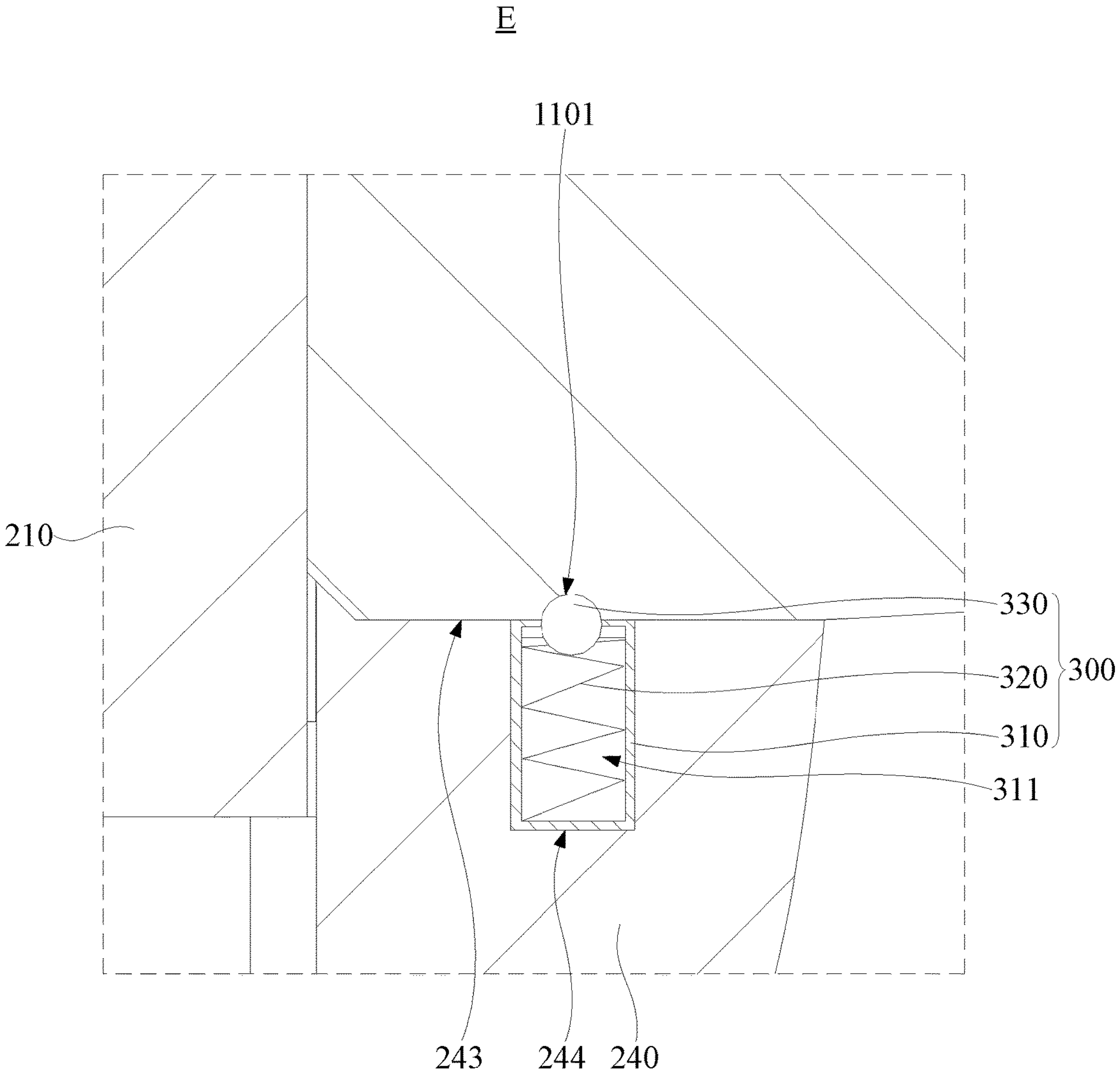
FIG. 17 is a schematic enlarged diagram showing part E of the power adaption device illustrated in FIG. 16.

As shown in FIGS. 15-17, in another one of the embodiments, the insertion member 110 is formed with an engagement trough 1101, and the casing 240 is formed, in a trough wall of the flatness receiving trough 243, with a mounting hole 244. The power adaption device 10 further comprises an elastic engagement member 300, and the elastic engagement member 300 is mounted in the mounting hole 244. The elastic engagement member 300 is partially and elastically engageable with the engagement trough 1101, so as to have the insertion member 110 connected, by means of the elastic engagement member 300, with the casing 240. In the instant embodiment, when the insertion member 110 is inserted into the insertion hole 211 to reach a predetermined location, a portion of the elastic engagement member 300 extends into the engagement trough 1101 to engage and connect the insertion member 110. In this way, the insertion member 110 is further connectable, by means of the elastic engagement member 300, with the casing 240, to thereby enhance the firmness of connection between the electrical cord assembly 100 and the adaptor plug assembly 200.

As shown in FIG. 17, further, the elastic engagement member 300 comprises a mounting sleeve 310, an elastic piece 320, and an abutting piece 330. The mounting sleeve 310 is disposed in the mounting hole 244 and is fixedly connected to the casing 240. The mounting sleeve 310 forms a mounting channel 311, and the elastic piece 320 is disposed in the mounting channel 311 and abuts the mounting sleeve 310. A portion of the abutting piece 330 is located in the mounting channel 311 and in abutting engagement with the elastic piece 320. The abutting piece 330 is receivable into and engageable with the engagement trough 1101 of the insertion member 110. In the instant embodiment, when the insertion member 110 is separated from the insertion hole 211, at least a portion of the abutting piece 330, as being biased by the elastic piece 320, protrudes out of the mounting channel 311. During a course of the insertion member 110 being inserted into the insertion hole 211, a surface of the insertion member 110 is brought into contact with the abutting piece 330, so as to push the abutting piece 330 to compress the elastic piece 320 and completely moving into the mounting channel 311, in order to prevent the abutting piece 330 from hindering the insertion of the insertion member 110 into the insertion hole 211. When the insertion member 110 has been inserted into the insertion hole 211 to reach the predetermined position, the abutting piece 330 is set in alignment with the engagement trough 1101 of the insertion member 110, and under such a condition, the abutting piece 330, as being biased by the elastic piece 320, is forced to get into the engagement trough 1101 to have the abutting piece 330 received into and engaging with the engagement trough 1101, so as to enhance the firmness of connection between the electrical cord assembly 100 and the adaptor plug assembly 200.

As shown in FIG. 17, further, the elastic piece 320 is a spring. Of course, in other embodiments, the elastic piece 320 can be a silicone rubber object, a rubber object, or other existing elastic structures.

As shown in FIG. 17, further, the abutting piece 330 is of a spherical form, so that the abutting piece 330 can be better driven into the mounting channel 311 during the course of the insertion member 110 being inserted into the insertion hole 211.

Compared with the prior art, the application possesses at least the following advantages:

The tightness adjustment member 220 is screwed into and connected to the adjustment hole 212 and abuts the electrical cord assembly 100, so that by twisting the tightness adjustment member 220, an action force between the electrical cord assembly 100 and the tightness adjustment member 220 can be adjusted, and thus tightness that the tightness adjustment member 220 induces in the insertion hole 211 can be adjusted. In other words, when the power adaption device 10 is to be put into operation, the tightness adjustment member 220 is twisted tight in order to increase the action force between the electrical cord assembly 100 and the tightness adjustment member 220 to thereby enhance firmness of the electrical cord assembly 100 retained in the insertion hole 211 to prevent the electrical cord assembly 100 from being erroneously pulled out of the insertion hole 211 and thus preventing an issue that the supply of electricity to the electronic component is unexpectedly cut off; and when it needs to separate the electrical cord assembly 100 and the adaptor plug assembly 200, the tightness adjustment member 220 is twisted loose to decrease the action force between the electrical cord assembly 100 and the tightness adjustment member 220 so as to reduce the firmness of the electrical cord assembly 100 retained in the insertion hole 211 to allow the electrical cord assembly 100 to be withdrawn. In this way, by means of twisting of the tightness adjustment member 220, an issue of unexpected separation of the electrical cord assembly 100 from the adaptor plug assembly 200 can be prevented to thereby prevent mistakenly cutting off the supply of electricity to the electronic component, while easiness of separating the electrical cord assembly 100 from the adaptor plug assembly 200 can be enhanced.

The above description discusses only some of the embodiments of the application, and the description is made in a more specific and more detailed way, but should not be construed as limiting to the invention scope defined in the claims. It is noted that those having ordinary skill in the field may contemplate various modifications and improvements without departing from the inventive idea of the application, and such are all considered belonging to the scope of protection that the application pursues. Thus, the scope of patent protection of the application is determined only by the claims appended herein.

What is claimed is:

1. A power adaption device, comprising:
an electrical cord assembly; and
an adaptor plug assembly, the adaptor plug assembly comprising an electrical conduction member and a tightness adjustment member, the electrical conduction member being formed with an insertion hole and an adjustment hole in communication with each other, the electrical cord assembly being insertable into the insertion hole to electrically connect the electrical cord assembly with the electrical conduction member; the tightness adjustment member being screwable into and connected with the adjustment hole to abut the electrical cord assembly;
wherein the adaptor plug assembly further comprises a pre-fixing spring plate, a pre-fixing spring plate being fit in and connected to the adjustment hole, the pre-fixing spring plate being partly located in the insertion hole and abutting the electrical cord assembly to achieve pre-fixing of the electrical cord assembly; and
the tightness adjustment member is screwed into and connected to the adjustment hole to compress the pre-fixing spring plate in order to increase an abutting force that the pre-fixing spring plate applies to the electrical cord assembly to fixedly connect the electrical cord assembly in the insertion hole.

2. The power adaption device according to claim 1, wherein the adjustment hole comprises a threaded hole and a receptacle hole; and
the tightness adjustment member comprises an operating end portion received in the receptacle hole, a threaded rod which is screwed into and connected in the threaded hole to abut the electrical cord assembly, and an elastic covering layer which encloses the operating end portion and is set in abutting engagement with the operating end portion and a hole wall of the receptacle hole, so that the operating end portion is kept in abutting engagement with the hole wall of the receptacle hole via the elastic covering layer.

3. The power adaption device according to claim 1, wherein the electrical cord assembly comprises:
an insertion member, the insertion member being insertable into the insertion hole; and
a flexible protection member, the flexible protection member being connected to the insertion member, the flexible protection member being positionable to cover the adjustment hole.

4. The power adaption device according to claim 3, wherein the adaptor plug assembly further comprises a casing, the electrical conduction member being disposed in the casing;
the casing is formed with an insertion avoiding hole and an adjustment avoiding hole, the insertion avoiding hole being in communication with the insertion hole, the adjustment avoiding hole being in communication with the adjustment hole; and
the casing is further formed, in an outside thereof, with a flatness receiving trough, the flatness receiving trough being in communication with the adjustment avoiding hole, the flatness receiving trough receiving the flexible protection member therein, an outside of the flexible protection member being flush with the outside of the casing.

5. The power adaption device according to claim 4, wherein one side of the flexible protection member that faces the adjustment avoiding hole is protruded to form a fixing portion, and the fixing portion is receivable into and connectable with the adjustment avoiding hole.

6. The power adaption device according to claim 4, wherein the electrical cord assembly further comprises a magnetic attraction member, the magnetic attraction member being connected to the flexible protection member, the magnetic attraction member being extendable through the adjustment avoiding hole to enter the adjustment hole to magnetically attract and connect with the tightness adjustment member.

7. The power adaption device according to claim 6, wherein the magnetic attraction member comprises a flexible portion and a magnet, a first end of the flexible portion being securely connected to the flexible protection member, the flexible portion being penetrable into the adjustment avoiding hole, the magnet being securely connected to a second end of the flexible portion, the magnet being positionable in the adjustment hole to attractively connect to the tightness adjustment member.

8. The power adaption device according to claim 4, wherein the flexible protection member comprises:
a connection portion, an end of the connection portion being connected to the insertion member, the connection portion being receivable in the flatness receiving trough, so that an outside of the connection portion is flush with the outside of the casing; and
a cover portion, the cover portion being connected to an opposite end of the connection portion, the cover portion being positionable on and covering the adjustment hole, the cover portion being receivable in the flatness receiving trough such that an outside of the cover portion is flush with the outside of the casing.

9. The power adaption device according to claim 8, wherein the connection portion is formed with a flexing zone.

10. The power adaption device according to claim 9, wherein the flexing zone is formed in one side of the connection portion that is adjacent to the tightness adjustment member.

11. The power adaption device according to claim 9, wherein the flexing zone is made in the form of an arc slot structure.

12. The power adaption device according to claim 9, wherein the flexing zone has a reduced strength compared to other portions of the connection portion.

13. The power adaption device according to claim 9, wherein an included angle between the connection portion and the cover portion is 90°.

14. The power adaption device according to claim 13, wherein the connection portion and the cover portion are each of a plastic structure.

15. The power adaption device according to claim 14, wherein the connection portion and the cover portion are integrally formed as a one-piece structure.

16. The power adaption device according to claim 15, wherein the flexible protection member further comprises a warp-preventing steel plate, and the connection portion and the cover portion jointly enclose and connect with the warp-preventing steel plate, the warp-preventing steel plate and the flexing zone being shifted away from each other in a direction of extension of the connection portion.

* * * * *